United States Patent [19]
Ray et al.

[11] Patent Number: 5,789,726
[45] Date of Patent: Aug. 4, 1998

[54] METHOD AND APPARATUS FOR ENHANCED TRANSACTION CARD COMPRESSION EMPLOYING INTERSTITIAL WEIGHTS

[75] Inventors: Lawrence A. Ray, Rochester; Bhavan R. Gandhi, Pittsford; Gene E. Pios, Spencerport, all of N.Y.

[73] Assignee: Eastman Kodak Company, Rochester, N.Y.

[21] Appl. No.: 758,120

[22] Filed: Nov. 25, 1996

[51] Int. Cl.$^6$ ............................................. G06K 5/00
[52] U.S. Cl. ............................................. 235/380; 382/220
[58] Field of Search ........................... 235/380; 382/220, 382/115, 253

[56] References Cited

U.S. PATENT DOCUMENTS

| | | | |
|---|---|---|---|
| 4,528,639 | 7/1985 | Edwards | 364/723 |
| 5,384,912 | 1/1995 | Ogrinc et al. | 345/523 |
| 5,466,918 | 11/1995 | Ray et al. | 235/380 |
| 5,541,653 | 7/1996 | Peters et al. | 348/264 |
| 5,561,722 | 10/1996 | Watari et al. | 382/220 |

FOREIGN PATENT DOCUMENTS

| | | | |
|---|---|---|---|
| WO 94/27252 | 11/1994 | WIPO | 382/253 |

OTHER PUBLICATIONS

Robert M. Gray, "Vector Quantization," IEEE ASSP Magazine, Apr. 1984, pp. 4–28.

*Primary Examiner*—Donald T. Hajec
*Assistant Examiner*—Jacob Eisenberg
*Attorney, Agent, or Firm*—Edward Dugas

[57] ABSTRACT

A method of encoding and decoding a transaction card with a block of image data digitally representing the features of a digital portrait of an authorized transaction card user is disclosed along with apparatus for performing the method. The encoding method partitions the digital portrait of the transaction card user into feature blocks. Each feature block is compared against a library of like feature blocks to determine the best match with a pair of library feature blocks. The library's feature blocks are derived from a plurality of portraits taken from the general population. Each library feature block is represented (addressed for access) by a code-vector in a codebook. The two code-vectors corresponding to the two closest matching features blocks from the library of like feature blocks are recorded onto a transaction card along with an interstitial pointer which indicates a weight to be allocated to each of the two code-vectors to form a better match for at least one of the library feature blocks to the user's feature blocks. All of the code-vectors and the interstitial pointers corresponding to the user's feature blocks are recorded as a sequence of sub-data blocks within an image data block on the transaction card. A method and associated apparatus for reading out the image data block and recreating a representation of the portrait of the transaction card user at a financial transaction site for identification purposes are also disclosed.

21 Claims, 8 Drawing Sheets

METHOD AND APPARATUS FOR ENHANCED TRANSACTION CARD COMPRESSION EMPLOYING INTERSTITIAL WEIGHTS

FIELD OF THE INVENTION

The invention relates generally to the field of digital image data compression, and in particular to a method for improving the quality of digital image data that is used with a vector quantizing process when a constrained number of vector quantizer codebook entries are available.

BACKGROUND OF THE INVENTION

The present invention is a means of improving the image quality of decompressed digital images. The following is a brief description of vector quantization and a background description of a prior art system which will be improved by this invention.

Vector Quantization: Vector quantization is a standard method of performing digital image data compression. This method partitions an image into a set of small image blocks and compares each image block against an ordered set of predetermined blocks of like size and shape. The ordered set is known as the codebook, and an individual element in the set is referred to as a code-vector. Compression for a single image block is achieved by transmitting the index number of the code-vector which best matches the image block.

Decompression is accomplished by using the input index value and using the codebook as a look-up-table to find the desired image block to insert into the decompressed image. Hence, the decompression device also must have a copy of the codebook.

The partitioning of an image into image blocks is a process referred to as forming the image template. An image template is an ordered partitioning of a digital image into image blocks. The image template may be either implicit or explicit. An implicit image template is more common in standard vector quantization, in that all blocks are the same size and the ordering of the blocks are from the upper left-hand corner of the image to the lower right-hand corner of the image with a row order preference. Explicit templates describe the order, size and other salient information in a list or table. An explicit template is used by Ray, et. al., in U.S. Pat. No. 5,466,918, entitled, "Method and Apparatus for Image Compression, Storage, and Retrieval on Magnetic Transaction Cards." Explicit templates are used when the image blocks have properties which are not shared among all image blocks. In either case a template is available and will be assumed in the following discussion.

Vector quantization requires the formation of a codebook (s). A common method for developing a codebook is to have a library of images representative of the types of images which are to be compressed. These images are referred to as the training set. By considering the blocks as vectors, the blocks are characterized as points within a high-dimensional vector space. From this set a partitioning or clustering occurs which is a quantization of the vector space. A typical method of forming the partition is the so-called Lloyd-Buzo-Gray (LBG) algorithm (see "Vector Quantization," by R. M. Gray, IEEE ASSP Magazine, Vol. 1, April, 1984, pp. 4–29). Once the partitioning occurs, the quantization points of the vector space are common centroids of the training vectors assigned to each partition. When an image is to be compressed, it is also subjected to the same template as the training images, and each resultant image block is compared with all vectors in the codebook and the index of the best match is transmitted. The process is very much like a catalog, where a part is best matched and then referred to by its catalog number. The image is reconstructed by assembling the selected code-vectors using the same template.

Typically the quality of the reconstructed image is determined by a combination of factors such as the number of code-vectors, the size of the image blocks, the volume occupied by the vectors in the training set, and if the vectors to be compressed are encompassed by the volume of the training vectors. If more data capacity is made available, then the overall image quality may be improved either by using smaller vectors, or by increasing the number of code-vectors in the codebooks. Increasing the number of code-vectors has an advantage of a finer quantization of the image feature vector space occupied by training vectors, referred to as the training vector domain. This results in improved image quality. The undesirable aspect of this is an increase in the size of the codebooks. For many practical systems, the amount of data space reserved to store codebooks is limited. As a result, smaller data space codebooks would be preferable. Also, having more vectors, each of which are smaller, will address this problem. However, smaller vectors have a significant impact on the overall storage required for the compressed image. Reducing the vector size by a factor of two in each image dimension, requires four times as much data to store the compressed image.

System Embodiment: The following describes a practical system which uses vector quantization as the means of image compression where the size of the codebook is limited due to cost considerations of the decompression device.

For many documents it is desirable to make a visual verification of the document possessor. This is evident in the common practice of photo-identification cards and photographs on passports. While the inclusion of a photograph on a document is useful, the advent of digital imaging offers new opportunities to increase security by storing digital representations of a facial image to identify the owner or holder of the document. However, typical documents have an extremely limited data capacity available for the encoding of digital images. For instance, the common financial credit card with a magnetic stripe, has a data capacity of 57 bytes on a single track. Other documents have a larger data capacity available, though still small in terms of the data storage requirements normally associated with digital images.

A method to compress an image within the limited data capacity provided by financial cards has been developed (see U.S. Pat. No. 5,466,918, entitled "Method And Apparatus For Image Compression, Storage, And Retrieval On Magnetic Transaction Cards," by Ray, et al.). The method of that patent uses a variation of vector quantization with multiple spatially dependent codebooks and image preprocessing. Image quality is limited to the variability of images and how well code-vectors can be selected.

Some transaction documents, e.g., smart-cards, and documents with two-dimensional bar-codes permit more data to be stored than the traditional magnetic stripe. However, these methods of data storage still require significant levels of compression to enable the storage of facial images. In practical terms, the data capacity these methods afford can only be partially used for imaging, as data for other unspecified purposes must coexist with the compressed image data. For instance, in the case of a so-called smart-card, only about 256 bytes of data can be reasonably expected to be used for imaging. The result is more data space is available, but it is still very limited.

In many cases it is desirable to have two people have access to the services provided by a transaction card. Such instances are where a husband and wife have a joint account, and in the case of governmental benefits, where an assigned proxy or surrogate is given permission to represent an incapacitated individual. Smart-cards currently use a data structure where 256 bytes is a standard data block. This means that when data is extracted from the card at least 256 bytes are read. Therefore, having an image using 128 bytes or less affords the potential of two images per card using a single data block.

In producing transaction documents, the time required to reconstruct or decompress the image and the computational complexity of that task must be very low. The use of vector quantization is ideal for the reconstruction task, as it is largely a look-up-table approach with some limited post-processing. The implementation can be done without floating point processing or any specialized mathematical algorithms. The artifacts which are a side-effect of this algorithm can be effectively masked. As a result, vector-quantization is a preferred approach for the high-compression ratios required for this application.

SUMMARY OF THE INVENTION

The present invention is directed to overcoming one or more of the problems set forth above. Briefly summarized, according to one aspect of the present invention there is provided a method of encoding a transaction card with a block of image data digitally representing the features of a digital portrait of an authorized transaction card user, comprising the steps of:

a) partitioning the features of the digital portrait into feature blocks;

b) encoding each feature block with indexes of two code-vectors and one pointer indicating the weight of each of the two code-vectors;

c) storing the two code-vector indexes and the one pointer indicating the weight for each feature as a sequence of sub-data blocks within an image data block; and d) storing the image data block on a transaction card.

From the foregoing it can be seen that it is a preferred object of the present invention to provide a method that may be used to improve the image quality of a digital image that is compressed using vector quantization without increasing the data space required for storing codebooks while only increasing the data required to store the compressed image by a factor of between 2 to 3.

Advantageous Effect of The Invention

The present invention has the advantages of significantly improving the image quality of images which are compressed using vector quantization while retaining the same size vector codebook. This is useful when in practical systems where data storage space is limited. The current invention does require slightly more than a doubling of the data storage for the compressed data. The current invention maintains a simple decompression method, requiring relatively inexpensive processors. The result is that decompression processors achieve improved image quality without increasing the processor cost.

These and other aspects, objects, features, and advantages of the present invention will be more clearly understood and appreciated from a review of the following detailed description of the preferred embodiments, appended claims, and by reference to the accompanying drawings.

BRIEF DESCRIPTION OF THE DRAWINGS

To facilitate understanding, identical reference numerals have been used in the drawings, where possible, to designate identical elements.

DETAILED DESCRIPTION OF THE INVENTION

The preferred method embodiment of the invention functions to compress and store a facial image which has been captured in passport fashion, i.e., face front with even illumination, in 127 bytes of data. The facial image is partitioned into a set of image feature blocks which are each compared against an ordered set of predetermined feature blocks of like size and shape known as codebooks. For monochrome images, the required codebooks must be stored in, at most, one megabyte of data. This embodiment is appropriate for smart-cards and two-dimensional bar-codes.

An image template as described by Ray, et al., in U.S. Pat. No. 5,466,918, entitled "Method and Apparatus for Image Compression, Storage, and Retrieval on Magnetic Transaction Cards," decomposes a facial image into a number of image (feature) blocks which are referenced by pointers into associated codebooks. There may also be a miscellaneous class identifier which occupies one byte. The following assumes a similar configuration. In particular, there are 56 image blocks specifically referenced by a pointer into a codebook. The selection of a codebook is known by the position of a pointer in the pointer list and a table common to both the compression and decompression system. Each pointer may reference one of 225 code-vectors contained in the selected codebook. The number of codebooks and the requisite storage for those codebooks is slightly less than 1 megabyte for a monochrome image.

The present invention incorporates two such pointers for each image block plus two additional bits to address interstitial points. A description of interstitial points follows below. The required amount of data for the preferred configuration is 1 byte for the image classifier, 112 bytes for code-vector pointers, and 14 bytes for the quantized interstitial data points. The total is 127 bytes of data. This configuration has been selected in order to fit within the constraints of a 127 byte data record. For those instances where larger data records are desirable, then the amount of data reserved for such items as the interstitial points can easily be extended while retaining the essential gist of the invention.

Figure 1:
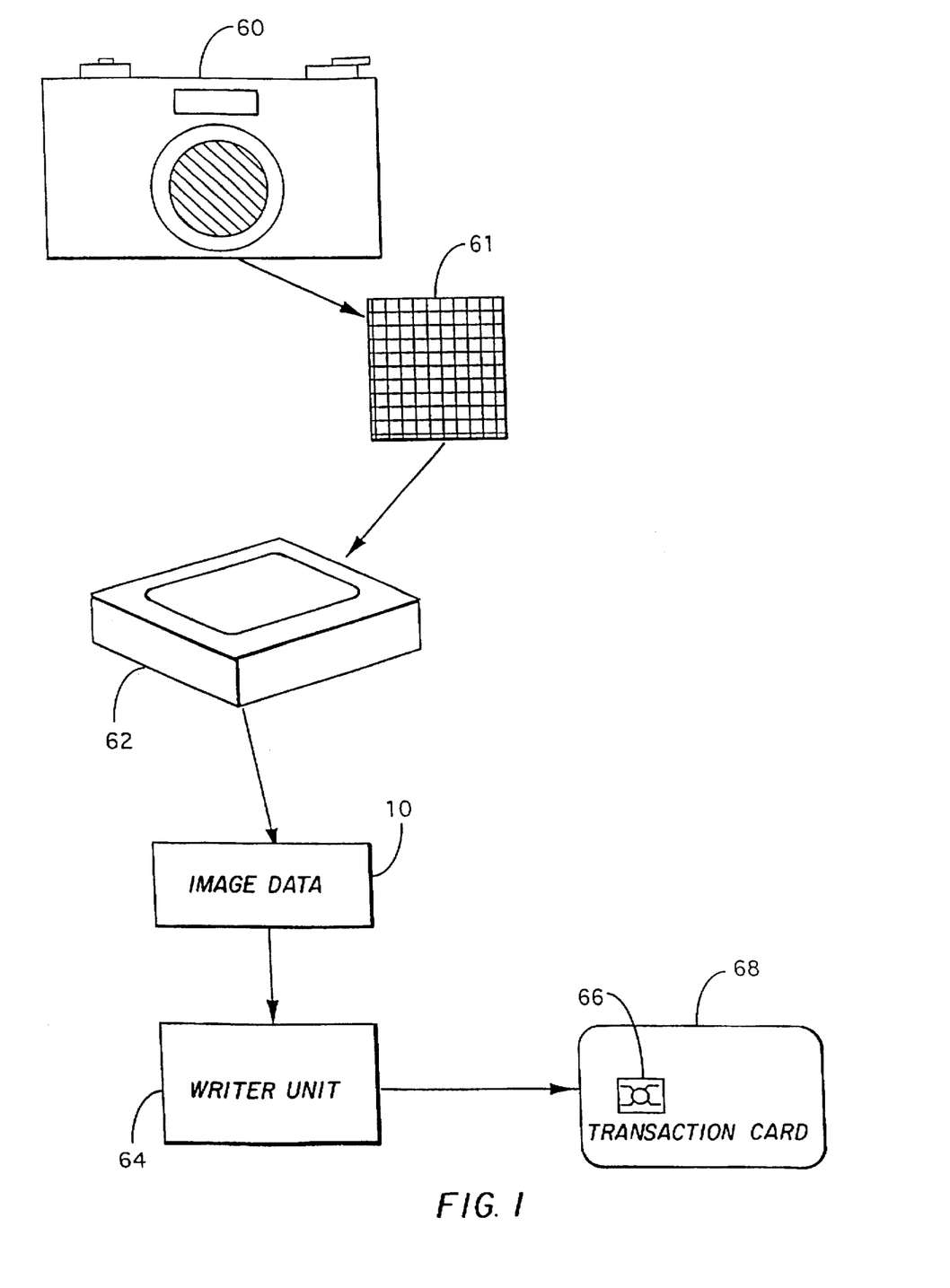
FIG. 1 is a block flow diagram of a system for encoding and storing compressed facial image data.

Referring to FIG. 1, a digital camera 60 is used to capture a matrix of pixel values 61, representing the portrait image of a person associated with the use of a transaction card 68. The matrix of pixel values 61 are compressed into image data 10 by a processing unit 62 utilizing a method to be described. The image data 10 is read out of the processing unit 62 by a writer unit 64 which functions to write the image data 10 onto the storage area 66 of the transaction card 68.

Figure 2:
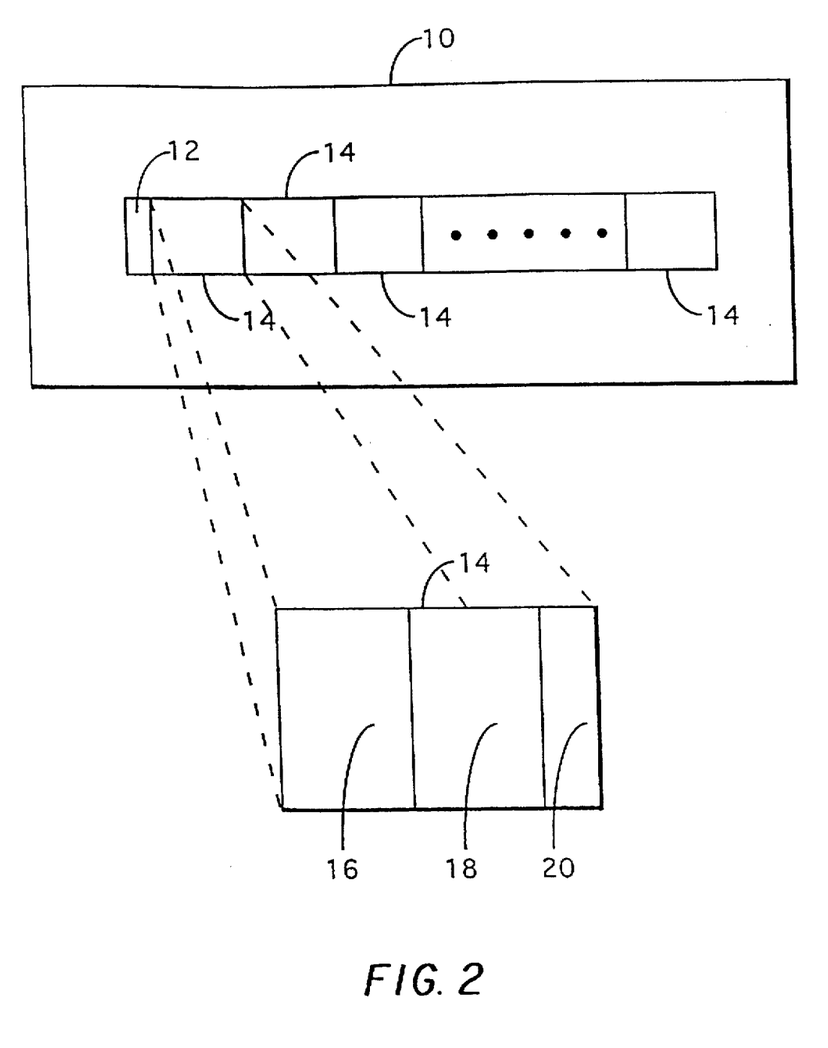
FIG. 2 is a schematic diagram of a data record.

FIG. 2 is a diagram of the format for the image data 10. The image data 10 is comprised of a miscellaneous class identifier 12 and 56 sub-data blocks 14. The miscellaneous class identifier 12 may be used to assist in identifying codebooks as to type, for example, codebooks containing files specifically of female subjects. Each sub-record 14 is comprised of a left-hand code-vector pointer 16, a right-hand code-vector pointer 18, and a 2-bit quantized interstitial pointer 20.

In this embodiment the number of bits needed to represent a quantized interstitial pointer 20 is constant for each image block. This does not preclude the potential of having a different number of bits representing the quantized interstitial pointers depending upon the codebook type or image block.

Figure 3:
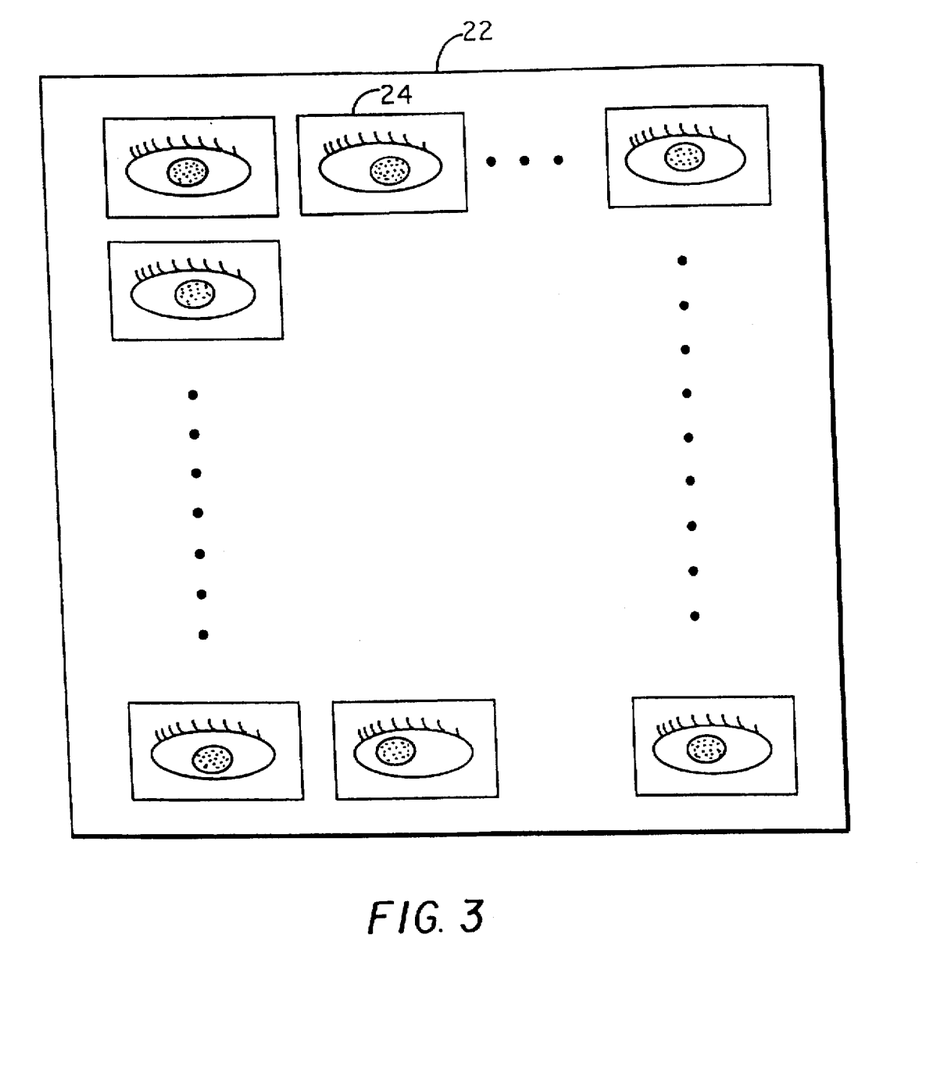
FIG. 3 is a depiction of multiple versions of a single facial feature that would be stored in a codebook.

FIG. 3 is a representation of a codebook 22 containing 225 code-vectors 24, each of which is a digital representation of one human facial feature compiled from a collection of facial images. Individual code-vectors in a codebook are each identified by a unique index value. For the FIG. 3 codebook representation the human eye is the facial feature. A complete system will have a plurality of codebooks each representing a particular facial feature so as to enable the construction of a composite facial image.

Figure 4:
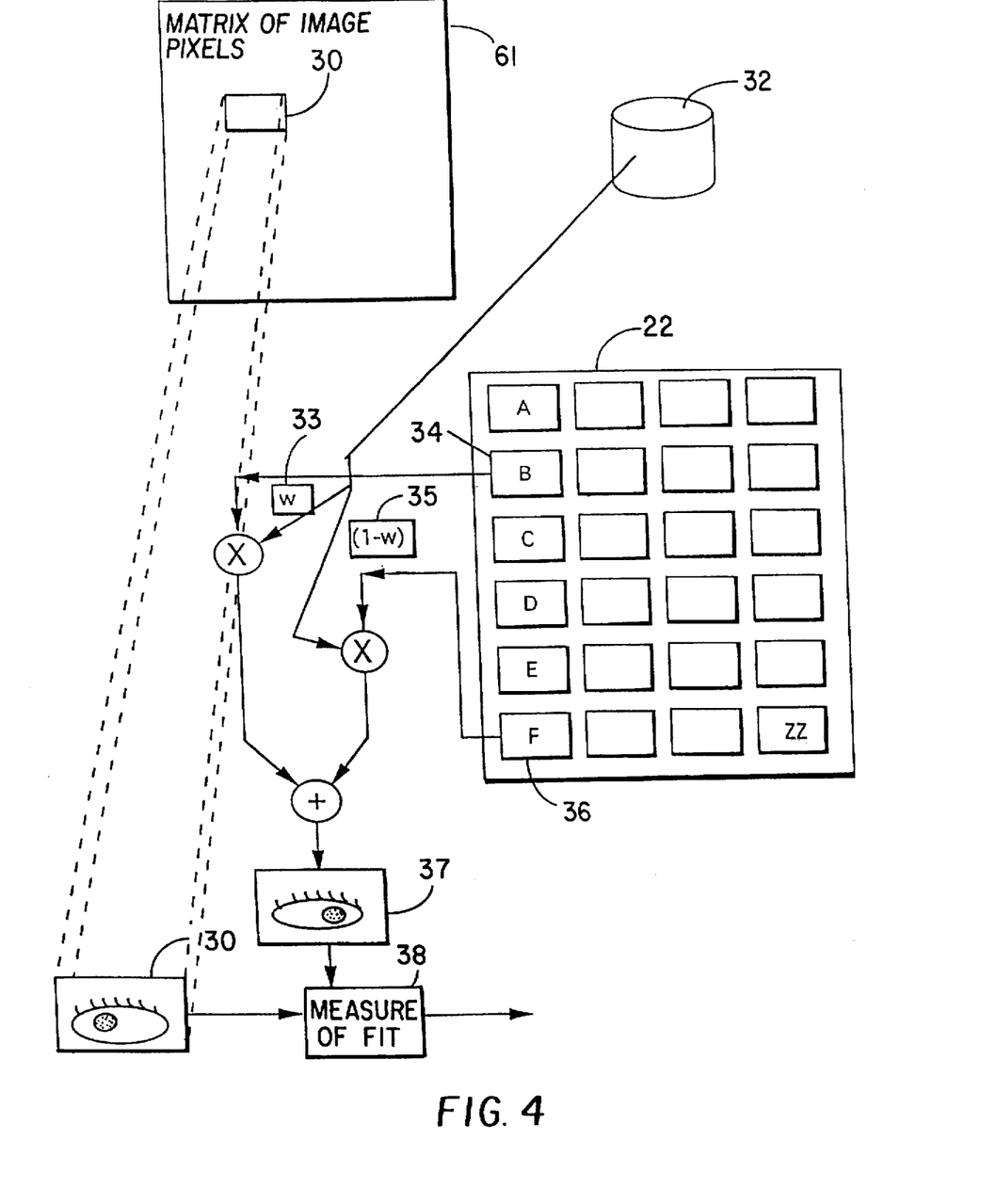
FIG. 4 is a block flow diagram illustrating the addressing of a codebook to compare a codebook stored feature against a corresponding feature derived from an original facial image for purposes of compressing the data needed to recreate a likeness of the feature derived from the original.

The method depicted in FIG. 4 determines the measure of fit of an interstitial code-vector 37 and a section of an image represented by the image block 30. The interstitial code-vector 37 is a combination of a pair of code-vectors 34 and 36, and associated interstitial weights 33 (W) and 35 (1-W) taken from a collection of possible interstitial weights 32. The interstitial weight 33 (W) is applied to the code-vector 34 using a scalar multiplication and the interstitial weight 35 (1-W) is applied to the code-vector 36 also using scalar multiplication. The results of the previous calculations are combined by vector addition to form the interstitial code-vector 37. A measure of fit is performed by the processor 62 of FIG. 1, per block 38, with the interstitial code-vector 37 and the image block 30. A preferred measure of fit is the standard mean-square-error.

Figure 5:
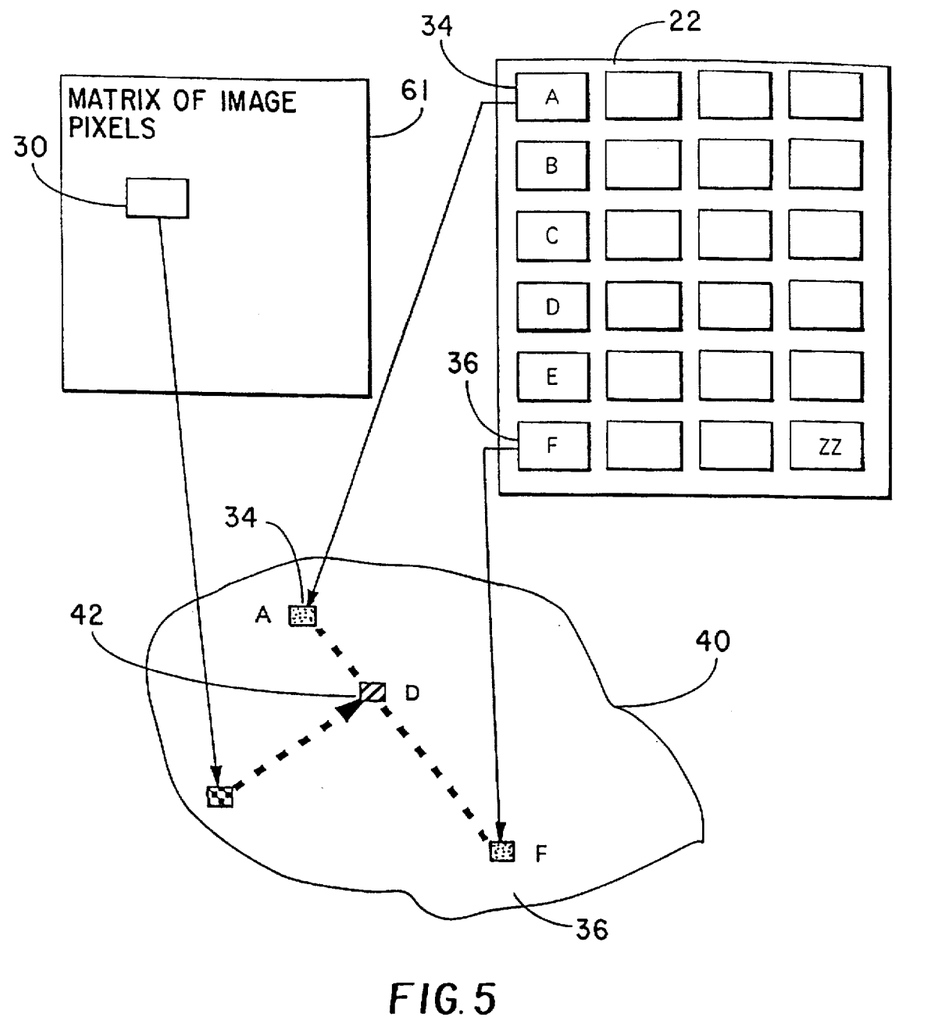
FIG. 5 illustrates in block diagram a technique for deriving an interstitial weight.
Figure 6:
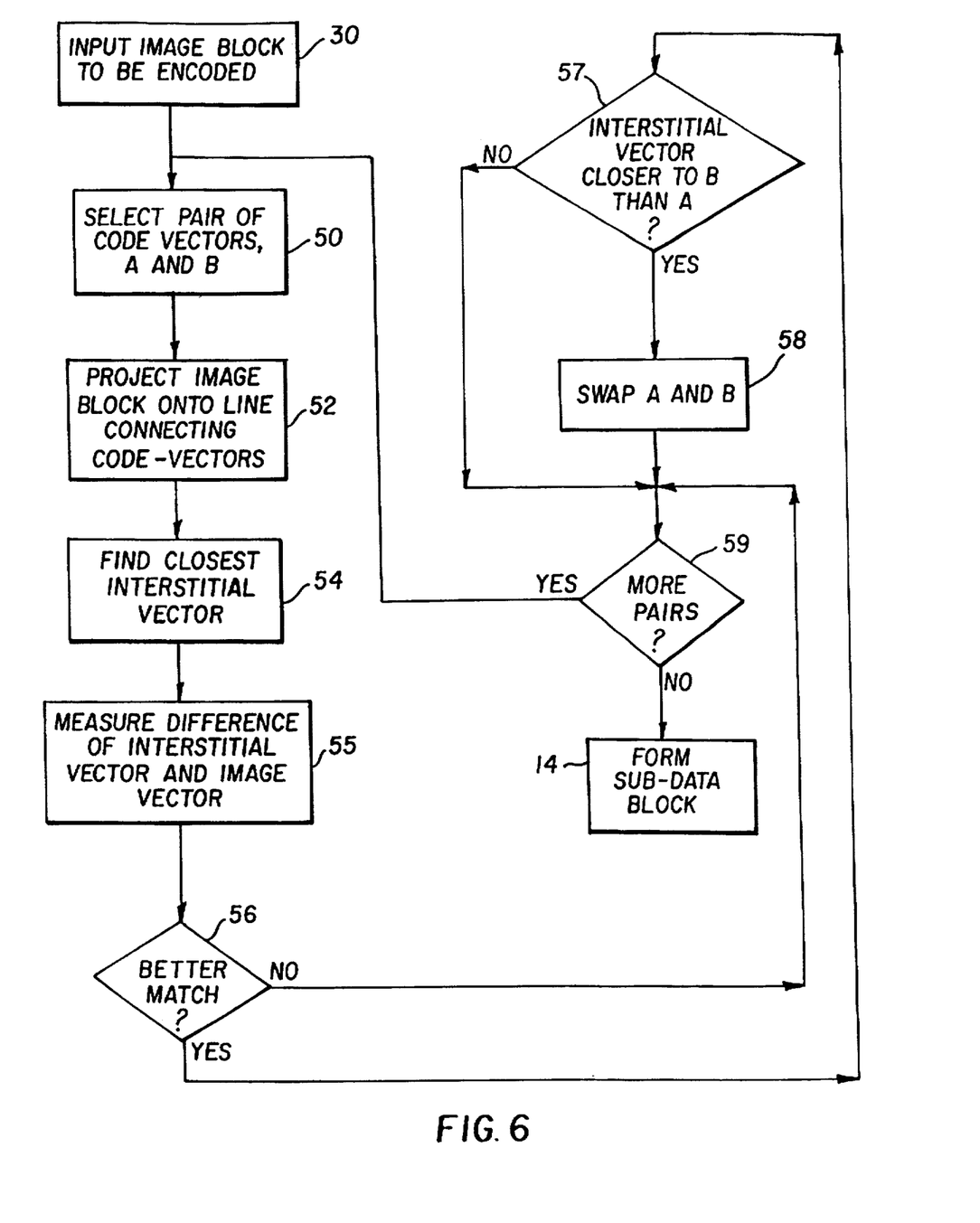
FIG. 6 illustrates the method of the present invention in flow chart form.

Turning now to FIG. 5, for the pair of code-vectors A(34) and F(36) and the image block 30, a projection of the vector representation of the image block 30 onto the line AF intersects at a vector D (42) in a vector space 40. D is related to A and F by the following formula:

$$D = \beta A + (1-\beta) F \quad \text{Eq. (1)}$$

where:

$$\beta = \frac{\sum_{i=1}^{n}(V_i - A_i)(F_i - A_i)}{\sum_{i=1}^{n}(A_i - F_i)^2} \quad \text{Eq. (2)}$$

and n equals the number of pixels in the image block 30 (code-vector size). The utility of the previously described equations will be described in conjunction with the description of the flow diagram of FIG. 6.

Referring now to the flow diagram of FIG. 6, the image block 30 is extracted from the matrix of pixel values 61 and represented by a vector. A pair of code-vectors A and B are selected from the codebook 22. The selection process 50 sequentially takes each possible pair and processes them individually. For a given pair A and B the projection process 52 of FIG. 5 is performed and the resulting value β is determined. In block 54 the value β is mapped to the closest number encoded by the interstitial pointer which number is defined as ω. The interstitial pointer number ω is used to find the closest interstitial vector by replacing β with ω in formula (1) above. In block 55 the function of block 38 of FIG. 4 is applied. Block 56 then questions whether the measure of fit of the current interstitial vector is preferable to previously measured interstitial vectors. If this is the first measure of fit the answer is always "Yes." If the answer is "Yes" the process proceeds to ask the question of block 57 whether the ω number (value) is greater than 0.5. If so, then the index values of A and F are swapped per block 58. If the answer to the question of Block 57 is "No" the process proceeds to the question of block 59. To be noted, all of the processing from block 56 ends up at the question of block 59. If the question of block 56 is a "No" the process moves directly to block 59. A "Yes" answer at block 59 directs the process back for the selection of another pair of code-vectors per block 50. If the answer to the question of block 59 is a "No" then the process proceeds to form, per the selected embodiment, one of the 56 sub-data blocks 14, described previously.

The one sub-data block is formed by concatenating the index value of A, the index value of F, and an interstitial pointer I. The interstitial pointer I identifies the interstitial value selected from the collection of weights 32. The sub-data block 14 of FIG. 2 is the result of this concatenation. The above is repeated for every facial image block 30.

In FIG. 2, the data block 10 is constructed by concatenating the miscellaneous class identifier block 12 with the sequence of sub-data blocks 14 determined by the steps described above.

Per FIG. 1, and the description associated therewith, the resulting data block 10 is transferred to the transaction card writer unit 64 and subsequently is recorded onto the transaction card 68 and more particularly onto a data storage portion 66.

Since the number of code-vectors in the implementation is the same as the number of code-vectors used in the method disclosed by Ray, et al., in U.S. Pat. No. 5,466,918, the size of the codebooks remains the same. This is important for both hardware and software since this technique does not require any more memory for the codebooks.

Figure 7:
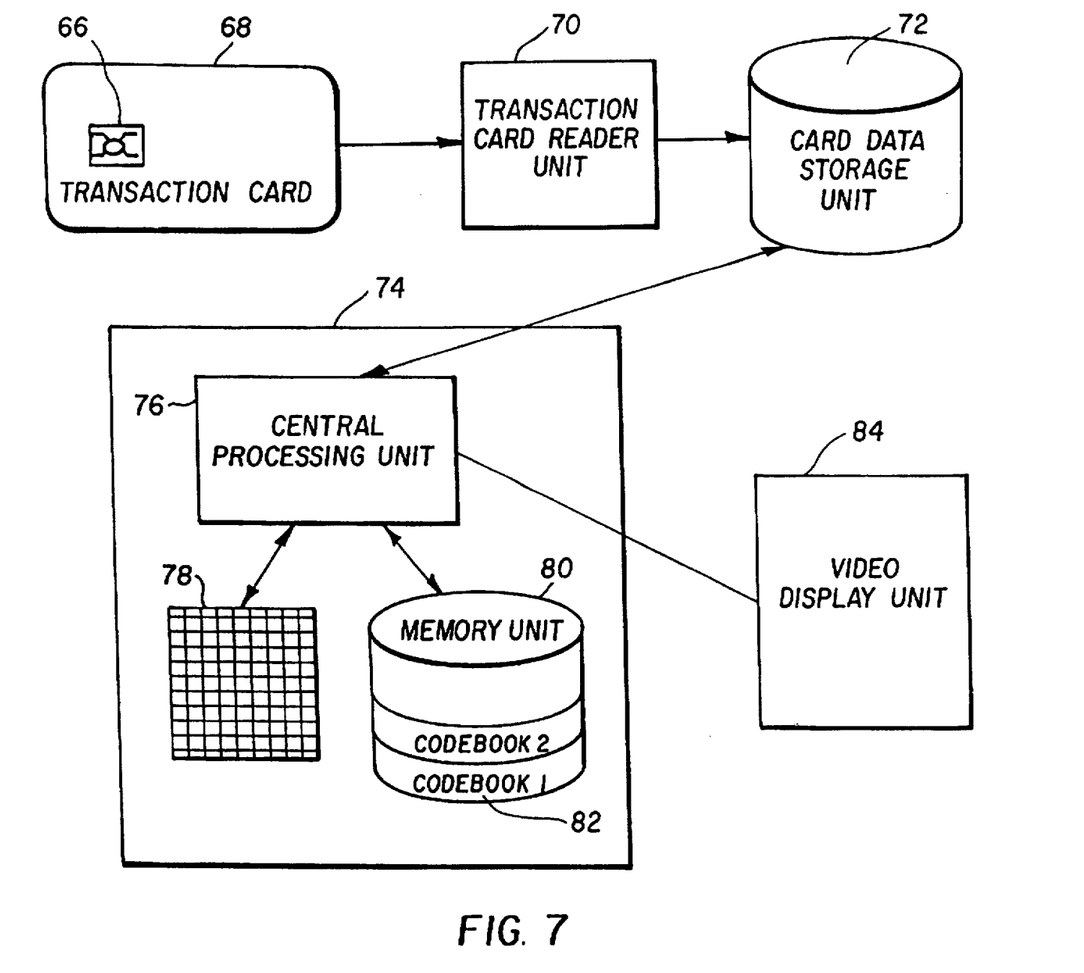
FIG. 7 illustrates a system for decompressing data from a transaction card and the formation of image data that is used to display an image on a video display that is a composite of features arranged as a likeness of the features in the original image.

Referring now to FIG. 7, the recorded image data 10 from the data storage portion 66 of the transaction card 68 is read by a transaction card reader 70. The recovered image data is directed to a card data storage unit 72 for temporary storage. A processor 74 accesses the image data from the card data storage unit 72. A matrix of pixel values 78, representing the matrix of image pixel values 61 in FIGS. 1, 4, and 5 is constructed by a central processing unit 76 according to the following method:

The miscellaneous class identifier 12 is extracted from the image data 10 and may be applied to assist in the accessing of the correct series of codebooks stored in a memory unit 80; for example, the codebooks representing female subjects. Next, the first of 56 sub data blocks 14 is extracted from the card data storage unit 72. Then, the first data block is utilized in conjunction with a template to access a codebook from the memory unit 80. Next, the left-hand code-vector pointer 16 of the data block 14 is used to address the accessed codebook 82 and the respective code-vector is extracted and referred to hereinafter as the left-hand code-vector. The extracted left-hand code-vector is stored temporarily in a buffer in the central processing unit 76. Next, the right-hand code-vector pointer 18, of the data pack 14, is used to address the accessed codebook and that respective code-vector is extracted and referred hereinafter as the right-hand code-vector. Next the interstitial pointer 20 is extracted. The interstitial pointer is used as a weighting factor H. In the preferred embodiment of the invention where 2 bits are assigned to the interstitial pointer, the weighting factor, H, is 1−(interstitial pointer value/9). The divisor 9 is derived by raising the bit states (2) by the number of bits assigned to the interstitial pointer (q)+1 and then adding 1. In this instance q=2 therefore the divisor =9. Next an interstitial code-vector I is formed by combining the left-hand code-vector L and the right-hand code-vector R in respective proportions H and 1−H.

$$I = HL + (1-H)R \qquad \text{Eq. (3)}$$

The interstitial code-vector I is modified in a manner specified by the respective template. The result is inserted into the matrix of pixel values 78 as specified by the template. The process is then repeated for the remaining 55 sub-data blocks 14. Once all data from the recorded image data 10 has been processed and inserted into the matrix of pixel values 78 the matrix of pixel values may be displayed on a video display unit 84 or directed to some other output device such as a printer.

The interstitial compression method of the present invention increases the computational complexity of the compressor in searching for the best interstitial code-vector match with the original image block. The complexity of the search is increased because the number of possible combinations has increased. Performing the compression by checking every possible interstitial combination is inefficient and impractical. There are two approaches which keep the search complexity more manageable. The first method has the advantage of producing a hierarchical structure, which enables applications having only the left-sided codes to continue having the best possible image quality, yet permitting the use of the interstitial method when additional right-sided codes are available for systems with more available data-capacity. This has the limitation of not necessarily generating the best image quality for the interstitial case. The second method produces an image with better quality.

A more sophisticated method for determining the best match interstitial code-vector is a two-pass search. The codebooks for the compression of Ray, et al., U.S. Pat. No. 5,466,918, were unstructured, i.e., the relative order of the code-vectors was random. By reorganizing the codebooks according to the method described below, a significant reduction in search complexity is achieved. There is no impact on the decompression, as that is performed in the same fashion as the unstructured case.

Figure 8:
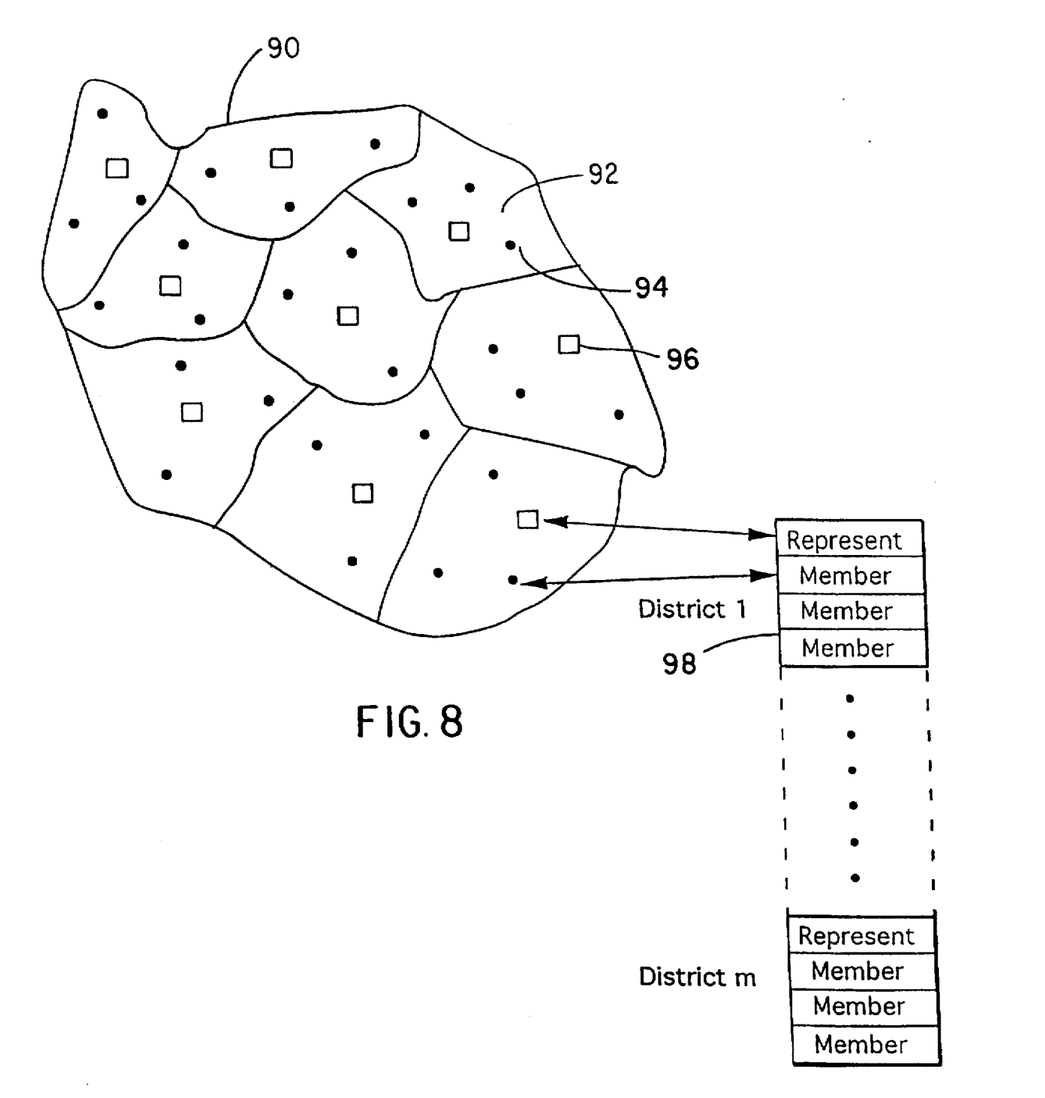
FIG. 8 illustrates a district representative-based codebook structure.

In the following, the structure of the codebooks becomes critical to the overall performance of the system. In the codebook generation method commonly used in vector quantization, the so-called LGB-algorithm, the code-vectors in the resulting codebook have no particular order. However, the following preferred embodiment imposes an organization. Referring to FIG. 8, each codebook can be conceived as occupying portions of a vector space 90. The codebooks should each be partitioned into clusters 92, with each cluster 92 having the same number of code-vectors 94. Moreover, each cluster 92 is organized such that one entry 96 (district representative) is most representative of the center of the cluster, and the partition is measured by the sum of the squared distance from each member 98 of the partition to its district representative. The sum of all these measures forms a cluster measure. The preferred partitioning of the codebook is the one that minimizes the cluster measure. There are many well-known algorithms for performing the described clustering and the particular method used is outside of the scope of this invention.

Hence a codebook can be partitioned into m districts, each comprised of n code-vectors, the total number of code-vectors in the codebook is thus mn. In the preferred embodiment m=15 and n=15. The compression is two-phased. The first phase performs the interstitial compression using only the district representatives. After selecting the two district representatives, which could be the same, all possible pairs, one member from each selected district, are compared to find the best pair of code-vectors and interstitial pointer.

By rearranging the image data 10, a hierarchical reconstruction scheme is obtained. This rearrangement reorders the image data 10 such that the first byte remains the miscellaneous data byte 12, the next 56 bytes are the left-hand code-vector pointers 16, followed by the 56 right-hand code-vector pointers 18 and finally the interstitial pointers 20. The required data space for storing the complete data record 10 remains the same, as this is simply a resorting of the data. In those instances where a lower quality reconstructed image is acceptable the first 57 bytes are sufficient to reconstruct the image, and in such an instance the truncated data record can be stored on the magnetic stripe of a credit card.

The invention has been described with reference to a preferred embodiment; However, it will be appreciated that variations and modifications can be effected by a person of ordinary skill in the art without departing from the scope of the invention.

| PARTS LIST: | |
|---|---|
| 10 | image data |
| 12 | miscellaneous class identifier |
| 14 | sub-data block |
| 16 | left-hand code-vector pointer |
| 18 | right-hand code-vector |
| 20 | 2-bit quantized interstitial pointer |
| 22 | codebook |
| 24 | code-vectors |
| 30 | image block |
| 32 | interstitial weights |
| 33 | interstitial weight (W) |
| 34 | code-vector |
| 35 | interstitial weight (1-W) |
| 36 | code-vector |
| 37 | interstitial code-vector |
| 38 | measure of fit |
| 40 | vector space |
| 42 | vector |
| 50 | selection process |
| 52 | projection process |
| 54 | find closest interstitial vector |
| 55 | measure difference of interstitial vector and image vector |
| 56 | question—measure of fit |
| 57 | question—interstitial vector closer to B than A |
| 58 | swap A and B |
| 59 | question—more pairs |
| 60 | digital camera |
| 61 | matrix of pixel values |

-continued

PARTS LIST:

| | |
|---|---|
| 62 | processing unit |
| 64 | writer unit |
| 66 | storage area |
| 68 | transaction card |
| 70 | transaction card reader |
| 72 | card data storage unit |
| 74 | processor |
| 78 | matrix of pixels |
| 76 | central processing unit |
| 80 | memory unit |
| 82 | codebook |
| 84 | video display unit |
| 90 | portions of a vector space |
| 92 | clusters |
| 94 | code-vectors |
| 96 | entry |
| 98 | member of the partition |

We claim:

1. A method of encoding a transaction card with a block of image data digitally representing features of a digital portrait of an authorized transaction card user, comprising the steps of:

a) partitioning the features of the digital portrait into feature blocks;

b) encoding each feature block with indexes of two code-vectors and one pointer indicating a weight for each of the two code-vectors;

c) storing the two code-vector indexes and the one pointer indicating the weight for each feature as a sequence of sub-data blocks within an image data block; and d) storing the image data block on a transaction card.

2. A method for recreating the features of a digital portrait of a transaction card user from a transaction card encoded according to claim 1 comprising the steps of:

a) reading the block of image data digitally representing the features of a digital portrait of an authorized transaction card user from a transaction card;

b) sequentially utilizing each sub-data block in said image data block to access codebooks each containing a data base of features extracted from the digital portraits of a large number of persons with each sub-data block accessing codebook features corresponding to the two code-vectors; and c) utilizing the one pointer of each sub-data block to weight the features corresponding to the two code-vectors of each sub-data block to derive weighted features that are arranged in a matrix so as to digitally recreate the features of the digital portrait of an authorized transaction card user.

3. The method for recreating the features of a digital portrait of a transaction card user from a transaction card encoded according to claim 2 and further comprising the step of:

d) displaying the derived matrix weighted features to enable a visual comparison of the recreated features of the digital portrait with the transaction card holder.

4. A method of encoding a transaction card with a block of image data digitally representing features of a digital portrait of an authorized transaction card user, comprising the steps of:

a) partitioning the digital portrait into blocks of features;

b) comparing each feature block against a library of like features, each feature represented by a code-vector in a codebook;

c) encoding each feature block with indexes of two code-vectors and a weight corresponding to the two matching features from the library of like features to a respective feature block and forming a pointer indicating a weight allocated to each of the two code-vectors to derive a best fit library feature;

d) storing the two code-vectors and the formed pointer for each feature block as a sequence of sub-data blocks within an image data block; and e) storing the image data block on a transaction card.

5. A method for recreating the features of a digital portrait of a transaction card user from a transaction card encoded according to claim 4 comprising the steps of:

a) reading the block of image data digitally representing the features of a digital portrait of an authorized transaction card user from a transaction card;

b) sequentially utilizing each sub-data block in said image data block to access codebooks each containing a data base of features extracted from the digital portraits of a large number of persons with each sub-data block accessing codebook features corresponding to the two code-vectors; and c) utilizing the one pointer of each sub-data block to weight the features corresponding to the two code-vectors of each sub-data block to derive weighted features that are arranged in a matrix so as to digitally recreate the features of the digital portrait of an authorized transaction card user.

6. The method for recreating the features of a digital portrait of a transaction card user from a transaction card encoded according to claim 5 and further comprising the step of:

d) displaying the derived matrix weighted features to enable a visual comparison of the recreated features of the digital portrait with the transaction card holder.

7. A method of encoding a transaction card with a block of image data digitally representing the features of a digital portrait of an authorized transaction card user, comprising the steps of:

a) partitioning the digital portrait into feature blocks;

b) comparing each feature block of step a) against a library of feature blocks derived by partitioning the digital portraits of a large number of persons;

c) determining a best match between each of the compared feature blocks of step a) and two of the feature blocks from the library of feature blocks;

d) assigning interstitial values to the values of the two feature blocks from the library of feature blocks to achieve a better match; and e) recording the addresses of the two best matched feature blocks from the library of feature blocks for each feature block of step a) and the corresponding interstitial values on a transaction card.

8. A method of encoding a transaction card with a block of image data digitally representing the features of a digital portrait of an authorized transaction card user according to claim 7 wherein the addresses of the two best matched feature blocks are represented by code-vectors and the interstitial values are represented by an interstitial code-vector.

9. A method for recreating the features of a digital portrait of a transaction card user from a transaction card encoded according to claim 7 comprising the steps of:

a) reading the addresses of the two best matched feature blocks and the corresponding interstitial values from a transaction card;

b) accessing the two best matched feature blocks from a library of feature blocks corresponding to the read addresses;

c) modifying at least one of the accessed two best matched feature blocks in accordance with the read interstitial values; and d) arranging the modified at least one of the two best matched feature blocks in a matrix so as to recreate a digital portrait having the features of a transaction card user.

10. Apparatus for encoding a transaction card with a block of image data digitally representing features of a digital portrait of an authorized transaction card user, comprising:

means for partitioning the digital portrait into feature blocks;

means for encoding each feature block with indexes of two code-vectors and one pointer indicating a weight for each of the two code-vectors;

means for storing the two code-vectors and one pointer for each feature as a sequence of sub-data blocks within an image data block; and means for storing the image data block on a transaction card.

11. Apparatus for recreating the features of a digital portrait of a transaction card user from a transaction card encoded according to claim 10 comprising:

means for reading the block of image data digitally representing the features of a digital portrait of an authorized transaction card user from a transaction card;

means for sequentially utilizing each sub-data block in said image data block to access codebooks each containing a data base of features extracted from the digital portraits of a large number of persons with each sub-data block accessing codebook features corresponding to the two code-vectors; and means for utilizing the one pointer of each sub-data block to weight the features corresponding to the two code-vectors of each sub-data block to derive weighted features that are arranged in a matrix so as to digitally recreate the features of the digital portrait of an authorized transaction card user.

12. The apparatus for recreating features of a digital portrait of a transaction card user from a transaction card encoded according to claim 11 and further comprising:

means for displaying the derived matrix weighted features to enable a visual comparison of the recreated features of the digital portrait with the transaction card holder.

13. Apparatus for encoding a transaction card with a block of image data digitally representing features of a digital portrait of an authorized transaction card user, comprising:

means for partitioning the digital portrait into blocks of features;

means for comparing each feature block against a library of like features, each feature represented by a code-vector in a codebook;

means for encoding each feature block with indexes of two code-vectors corresponding to the two closest matching features from the library of like features to a respective feature block and forming a pointer indicating the weight allocated to each of the two code-vectors to derive a best fit library feature;

means for storing the two code-vectors and the formed pointer for each feature block as a sequence of sub-data blocks within an image data block; and means for storing the image data block on a transaction card.

14. Apparatus for recreating the features of a digital portrait of a transaction card user from a transaction card encoded according to claim 13 comprising:

means for reading the block of image data digitally representing the features of a digital portrait of an authorized transaction card user from a transaction card;

means for sequentially utilizing each sub-data block in said image data block to access codebooks each containing a data base of features extracted from the digital portraits of a large number of persons with each sub-data block accessing codebook features corresponding to the two code-vectors; and means for utilizing the one pointer of each sub-data block to weight the features corresponding to the two code-vectors of each sub-data block to derive weighted features that are arranged in a matrix so as to digitally recreate the features of the digital portrait of an authorized transaction card user.

15. The apparatus for recreating the features of a digital portrait of a transaction card user from a transaction card encoded according to claim 14 and further comprising:

means for displaying the derived matrix weighted features to enable a visual comparison of the recreated features of the digital portrait with the transaction card holder.

16. Apparatus for encoding a transaction card with a block of image data digitally representing features of a digital portrait of an authorized transaction card user, comprising:

means for partitioning the digital portrait into feature blocks;

means for comparing each feature block against a library of feature blocks derived by partitioning the digital portraits of a large number of persons;

means for determining a best match between each of the compared feature blocks and two of the feature blocks from the library of feature blocks;

means for assigning interstitial weights to the two feature blocks from the library of feature blocks to achieve a closer match; and means for recording the addresses of the two closest matched feature blocks from the library of feature blocks and the corresponding interstitial values on a transaction card.

17. Apparatus for encoding a transaction card with a block of image data digitally representing the features of a digital portrait of an authorized transaction card user according to claim 16 wherein the addresses of the two closest matched feature blocks are represented by code-vectors and the interstitial values are represented by an interstitial code-vector.

18. Apparatus for recreating the features of a digital portrait of a transaction card user from a transaction card encoded according to claim 16 comprising:

means for reading the addresses of the two closest matched feature blocks and the corresponding interstitial values from a transaction card;

means for accessing the two closest matched feature blocks from a library of feature blocks corresponding to the read addresses;

means for modifying at least one of the accessed two closest matched feature blocks in accordance with the read interstitial values; and means for arranging the modified at least one of the two closest matched feature blocks in a matrix so as to recreate a digital portrait having the features of the authorized transaction card user.

19. A transaction card having stored thereon the sequence of sub-data blocks forming an image block derived by the method of claim 1.

20. A transaction card having stored thereon the sequence of sub-data blocks forming an image block derived by the method of claim 4.

21. A transaction card having stored thereon all of the addresses of the two closest matched feature blocks and their corresponding interstitial values derived by the method of claim 7.

* * * * *